May 23, 1961     B. W. FOSTER     2,985,407
ORNITHOPTER

Filed Oct. 28, 1958     3 Sheets-Sheet 1

INVENTOR.
BERRY W. FOSTER

BY

ATTORNEY

May 23, 1961  B. W. FOSTER  2,985,407
ORNITHOPTER
Filed Oct. 28, 1958  3 Sheets-Sheet 2

INVENTOR.
BERRY W. FOSTER
BY
ATTORNEY

INVENTOR.
BERRY W. FOSTER

United States Patent Office 2,985,407
Patented May 23, 1961

2,985,407
ORNITHOPTER
Berry W. Foster, 1147 10th St., Santa Monica, Calif.
Filed Oct. 28, 1958, Ser. No. 770,089
15 Claims. (Cl. 244—22)

This invention relates to an improved ornithopter, or, more particularly, to a flying machine which duplicates some of the flying principles of a dragonfly.

The aircraft of the present invention employs a novel type of free piston engine, disclosed and claimed in my co-pending patent application Serial No. 685,641, filed September 23, 1957, to power a plurality of flapping airfoils, which are arranged in tandem.

When a dragonfly or other tandem bi-wing insect flaps its wings, the front flapping wing produces a forced draft over the trailing wing; this forced draft over its wings gives the insect great maneuverability. One object of this invention is to utilize the flying principle of the dragonfly in an aircraft. Thus, my free-piston engine powers several alternate counter-flapping airfoils, which are arranged in tandem.

In another sense, the counter-flapping airfoils of my new aircraft are analogous to the several stages of a counter-rotating compressor.

Another object of the invention is to provide a type of aircraft that can be more maneuverable and efficient than a helicopter and is also simpler mechanically.

Another object is to provide an aircraft which is easily adapted to road use as a land vehicle. It really makes feasible a combined automobile-aircraft.

A brief reference to some basic theory may be helpful. When an airfoil is forced to flap, dynamic forces act on the wing as it accelerates and decelerates. If the wing is flapped at a high frequency, these dynamic forces become extremely large. For a wing with simple harmonic motion these dynamic forces are expressed by the following equations:

(1) $$H = \frac{W}{g} L . \phi_0^2 P^2 \left( \cos^2 pt . \cos \phi - \frac{1}{\phi_0} \sin pt . \sin \phi \right)$$

(2) $$V = \frac{W}{g} L . \phi_0^2 P^2 \left( \cos^2 pt . \sin \phi + \frac{1}{\phi_0} \sin pt . \cos \phi \right)$$

where:
H is the horizontal pull (the dynamic force) in the direction normal to the rocking shaft,
V is the vertical load component (dynamic force) normal to the rocking shaft,
W/g is the mass of the wing,
L is the equivalent blade length,
$\phi$ is the angular deflection from the horizon or mean angle,
$\phi_0$ is maximum angular deflection from the horizon or mean angle,
p is the flapping frequency in radius per second, and t is the time in seconds.

A counter mass may be used to prevent these dynamic loads from producing excessive bearing loads on the rocking shafts. This invention presents a unique arrangement in which the counter mass is another airfoil. Thus the dynamic loads can be taken through the airfoil structure, and the airfoils on both sides of the rocking shaft are used to produce lift. In other words, there is no parasite mass, and the bearings of the rocking shaft are subjected only to aerodynamic loads.

Other objects, advantages, and features of the invention will appear from the following description of some preferred embodiments thereof.

In the drawings:
Fig. 1 is a perspective view of a flying machine embodying the principles of the present invention.

In this invention, two or more airfoils are always employed in tandem. For the sake of balance and efficiency, it is advisable that each tandem set have an even number of airfoils. Any number of pairs may be used, and the following description of two particular arrangements only exemplifies the invention and does not limit it.

*Use of one engine to power four flapping airfoils (Figs. 1 and 2)*

Figure 1:
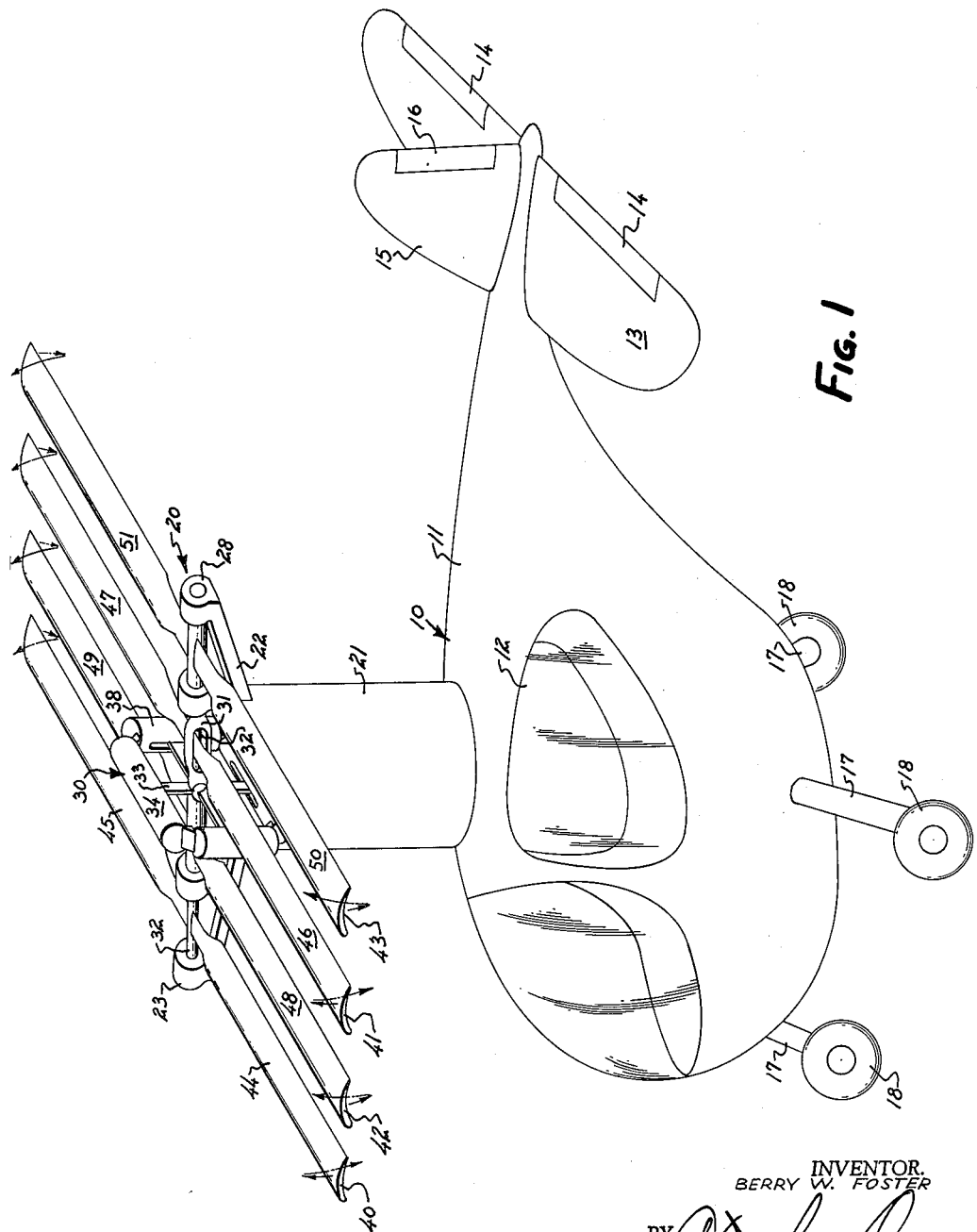

An aircraft 10 is shown in Fig. 1. Like most airplanes it has a fuselage 11 with a passenger compartment 12, a tail or horizontal stabilizer 13 with elevators 14, a vertical stabilizing fin 15 with a rudder 16, and a landing gear 17 with wheels 18; however, the aircraft 10 is novel in its lifting and powering device 20, which is shown in more detail in Fig. 2.

The device 20 is connected to the fuselage 11 by a column 21. Upon the column 21, in a manner that will presently be explained, is supported a movable beam 22 which includes a series of shaft-supporting bearings 23, 24, 25, 26, 27, and 28. The beam 22 also supports a square or parallelogram engine 30 of the type described in detail in my co-pending patent application Serial No. 685,641, filed September 23, 1957. The engine 30 acts to rock two counter-rotating concentric shafts 31 and 32. The outer shaft 31 is hollow and is journaled in the bearings 24, 25, 26, 27, and 28, while the shaft 32 is inside the hollow shaft 31, and is also journaled in the bearings 23, 24, 25, 26, and 27. As explained in Serial No. 685,641, the outer shaft 31 is connected to a synchronizing and power lever 33, which is connected at its opposite ends to the pistons inside one pair of parallel cylinders 34 and 35. Similarly, the inner shaft 32 is connected by a synchronizing and power lever 36 to the pistons inside the other pair of parallel cylinders 37 and 38.

Figure 2:
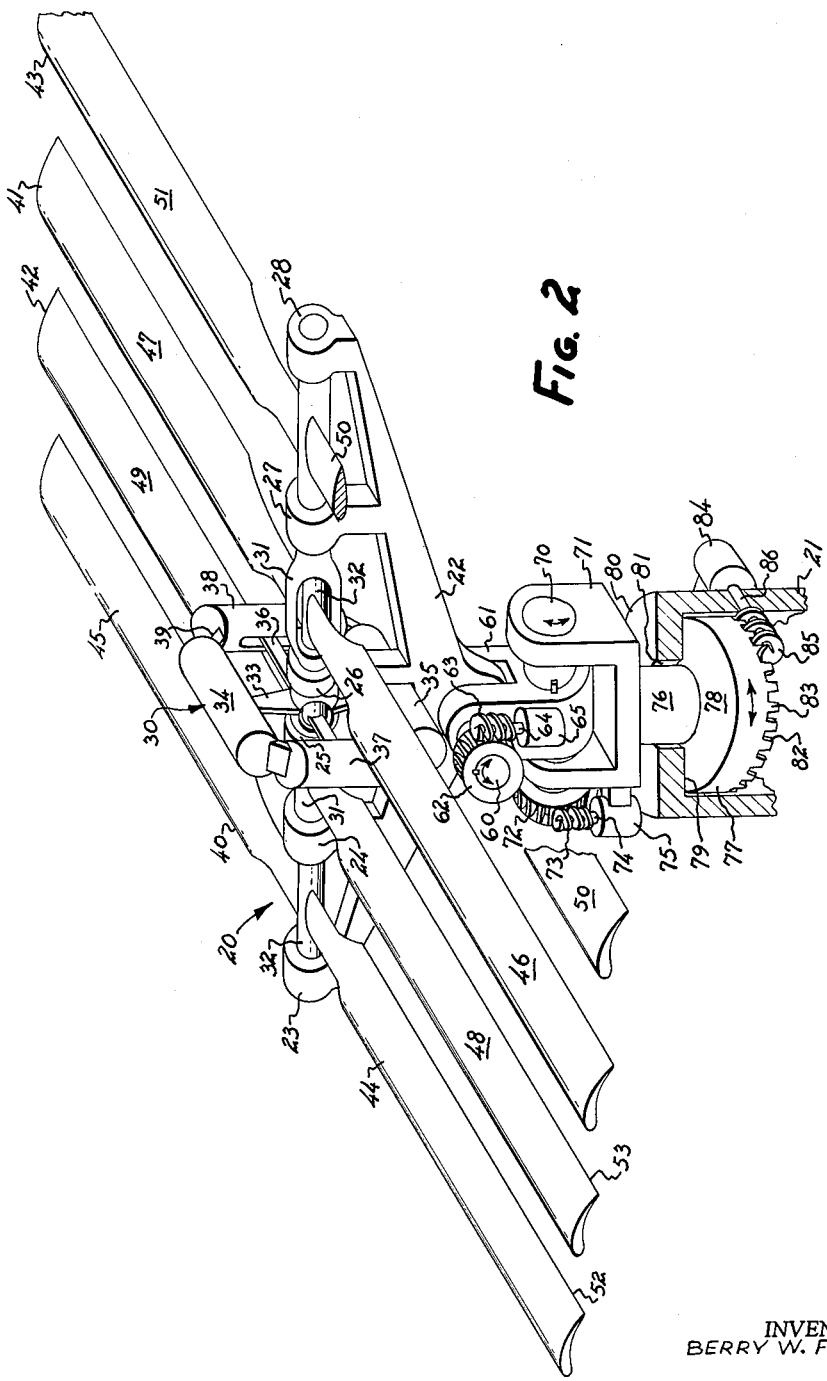
Fig. 2 is a perspective view, partly in section, of a portion of the machine of Fig. 1, showing one free-piston engine of the square type powering four flapping airfoils that are arranged in tandem, the adjacent airfoils flapping counter to each other. Some parts are broken away to show other parts more clearly.

As explained in Serial No. 685,641, the pistons in adjacent cylinders (e.g., consider the right-hand portion of the top cylinder 34 and the upper portion of the right-hand cylinder 38) move toward each other and then away from each other, converging toward the meeting corner such as the corner 39 in Fig. 2. The pistons in each pair of opposite cylinders 34, 35 and 37, 38 move 180° out of phase. As a result, the pistons in the cylinders 34, 35 rock the lever 33 and outer shaft 31 in one direction, while the pistons in the cylinders 37, 38 rock the lever 36 and inner shaft 32 in exactly the opposite direction. So the shafts 31 and 32 are exactly 180° out of phase.

In the present invention a front wing 40 and third wing 41 are secured to the inner shaft 32, while the second wing 42 and fourth (or rear) wing 43 are secured to the outer shaft 31.

The front wing 40 comprises a left section or airfoil tip 44 and a right section or airfoil tip 45 fastened opposite each other to the inner shaft 32, which rocks them. The third wing similarly comprises a left section or airfoil tip 46 and a right section or airfoil tip 47 secured opposite each other to the inner rocking shaft 32.

The second wing 42 comprises a left section or airfoil tip 48 and a right section or airfoil tip 49, which are fastened opposite each other to the outer rocking shaft 31, and the fourth or rear wing 43 comprises a left section or airfoil tip 50 and a right section or airfoil tip 51 secured opposite each other to the outer rocking shaft 31. The left and right sections of each wing are preferably diametrically opposite from each other, and are symmetrical so that the dynamic loads and the aerodynamic loads are symmetrical with respect to the rocking shafts.

When the inner shaft 32 rotates clockwise (looking forward) the airfoil tips 44 and 46 are forced up and the airfoil tips 45 and 47 are forced down. At the same time, the hollow outer shaft 31 rotates counterclockwise; so the airfoil tips 48 and 50 are forced down and the airfoil tips 49 and 51 are forced up. As the pistons of the engine 30 force the shafts 31 and 32 to rock 180° out of phase with respect to each other, the wings 40, 41, 42, and 43 are forced to rock or flap with their respective shafts. The flapping motion of the wings forces air to flow around and past the airfoil sections, and this airflow produces lift and forward thrust on the wings. By having the wings arranged in tandem, the draft which leaves the trailing edge 52 of the front wing 40 is forced to flow past the wings behind it. This increases air velocity past the trailing wings and gives added lift and forward thrust to these wings. Similarly, the draft leaving the trailing edge 53 of the second wing 42 produces a draft on the wings behind it, and so on. Since the adjacent wings are flapping 180° out of phase, some of the whirl is taken out of the air stream. In other words, the four flapping airfoil pairs in tandem act somewhat like a multistage compressor.

The engine pistons are preferably mechanically free from any fixed stroke limits, being stopped pneumatically by gas pressure loads. This recoil stopping of the pistons produces only small dynamic stopping loads on the flapping wings, and the amplitude and frequency of the flapping wings may be varied by varying the explosion pressure on the free pistons.

The lift and forward thrust of the flapping airfoils are taken by the bearings 23, 24, 25, 26, 27, and 28 which support the aircraft 10 through the beam 22. The beam 22 may be keyed or splined to a shaft 60 which is bearinged in the two prongs of a clevis 61. To the shaft 60 is secured a gear 62 whose teeth are concentric with the shaft 60. A worm gear 63 that meshes with the gear 62 is keyed to a drive shaft 64 of a reversible motor 65, which may be supported by the clevis 61. Thus, the angle of attack of the wings 40, 41, 42, 43 with respect to the horizon may be varied by running the motor 65 to drive the gear 63 and thereby adjust the angle between the forks of the clevis 61 and the beam 22. A locking device in the motor 65 makes it possible to set the angle of attack of the airfoils at any desired angle and then to lock the gears 62, 63 to hold that position. In this design, the angle of the airfoils with respect to their rocking shafts 31 and 32 remains constant. By adjusting their angle of attack, the flapping airfoils may be used to increase the ratio of the vertical lift to the forward thrust, for takeoff and landing.

In the exemplary design of Fig. 2, the clevis 61 is keyed or splined to a stub shaft 70, which is journaled in the forks of a clevis 71. The stub shaft 70 may be keyed or splined to a gear 72 that meshes with and is driven by a gear 73. The gear 73 may be mounted on a drive shaft 74 of a reversible motor 75 that is supported by the clevis 71. The motor 75 may be used to adjust the mean angle that the blade lengths make with the horizontal position, and it may have a locking device to hold the blades at any prescribed angle for banking and turning, for by this means an aircraft with this propulsion system can be made to turn. When the mean angle of the flapping wings is tipped down on the left side, a component of the aerodynamic forces normal to the blade produces a force to the left and tends to force this part of the aircraft to the left.

The forks of the clevis 71 may be supported in a vertical position by a vertical stub shaft 76 which has an enlarged end plate 77 secured to its lower end. The upper surface 78 of the plate 77 bears against the lower surface 79 of a plate 80, which is part of the column 21 and is thus rigidly fastened to the aircraft structure. The plate 80 has a hole 81 slightly larger than the shaft 76 in which the shaft 76 fits for free rotation. The bearing surfaces 78 and 79 act as a thrust bearing, and these surfaces may be kept approximately horizontal under normal flight conditions.

The bottom surface 82 of the end plate 77 may be provided with gear teeth 83 which are concentric with the stub-shaft 76. The plate 77, the stub-shaft 76, and the flapping airfoils structure may be rotated with respect to the aircraft fuselage 11 by means of a reversible motor 84 and a gear 85, which meshes with the gear 83. The gear 85 is keyed to the drive shaft 86 of the motor 84, which may be mounted on the aircraft fuselage 11. Thus, the motor 84 can be used to vary the direction which the horizontal thrust component makes with respect to the fuselage 11. This feature also makes it possible to drive this aircraft as an automobile on roads, for the wings can then be turned so that they lie parallel to the fuselage 11; thus they take up less width than a conventional automobile.

The pilot may have adjustable controls for the rudder 16 and the elevators 14 to help maneuver the aircraft in flight, and the adjustable means for the flapping airfoils may be used to maneuver the aircraft 10 in flight; it may be made to fly in almost any direction, including vertical takeoff and landing. One or more of the wheels 18 of the landing gear 17 may be powered to drive it (from an engine which is not shown) as a flying auto on the ground, when the airfoils are stationary. When the flying auto is traveling on a road, the wings are turned parallel to the fuselage by the motor 84; in this position it will not be as wide as a large automobile.

Figure 4:
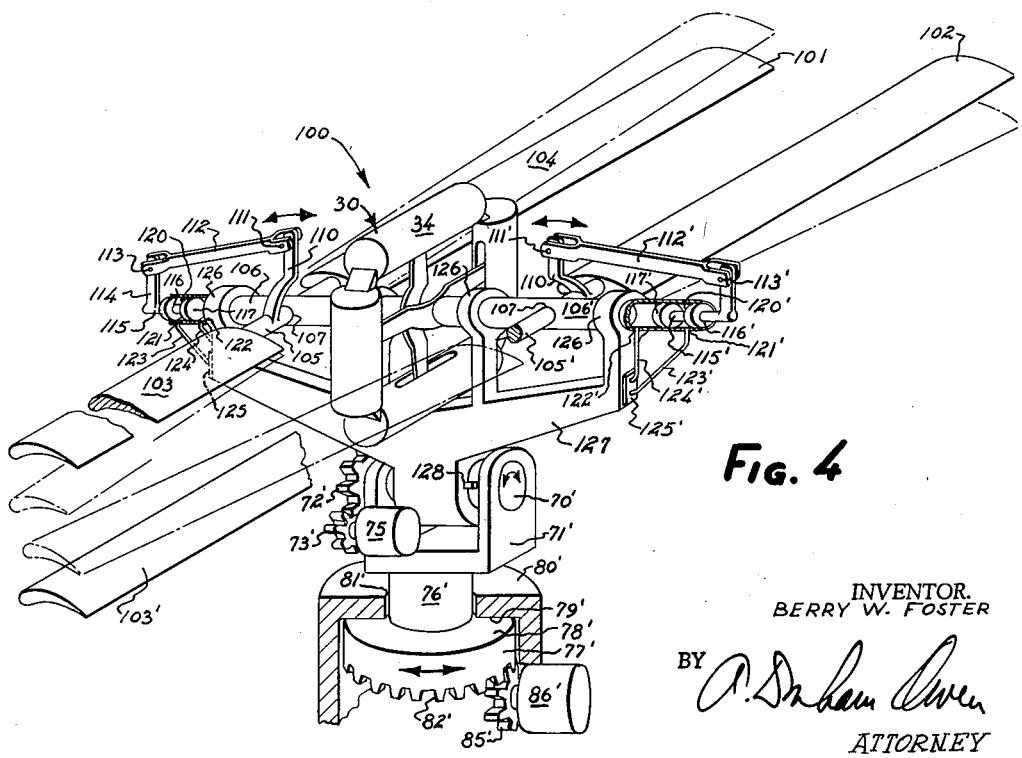
Fig. 4 is a perspective view, partly in section, of a portion of the machine of Fig. 3, where the free-piston engine powers a pair of counter-flapping airfoils arranged in tandem.

*Description of Fig. 4*

The basic difference between power and lift device 100 illustrated in Fig. 4 and the device 20 illustrated in Fig. 2 is that in the device 100 the angle of attack of the flapping airfoils is varied by a mechanism which changes their angle with respect to their rocking shafts, which may be retained in a near-horizontal position. In contrast, in the device 20 the angle of attack of the flapping airfoils is varied by changing the angle of the rocking shafts with respect to the horizon, the angle between the flapping airfoils and the rocking shafts being fixed.

By way of example, the engine 30 is used to power only two wings 101 and 102 in the device 100. The front wing 101 has a left section or airfoil tip 103 and a right section or airfoil tip 104, both cantilevered to opposite ends of a transverse shaft 105. The shaft 105 extends through and is journaled in an inner shaft 106 that is driven by the engine 30. This structure makes it possible for rotation of the shaft 105 to vary the angle of attack of the wing airfoil sections 103 and 104. Bearings 107 transmit the rocking torque load of the shaft 106 to the shaft 105 and to the cantilevered airfoils 103 and 104 without any play.

A lever 110 may be cantilevered to the shaft 105. A pin 111 at the upper end of the lever 110 is pivoted to a link 112, and the other end of the link 112 is pivoted to a pin 113 on a rod 114, which is cantilevered to a push-pull rod 115. The push-pull rod 115 reciprocates freely in a sealed opening 116 in the end of the shaft 106, and has a hydraulic piston 117 secured to its other end. The piston 117 moves in a hydraulic cylinder 120. Hydraulic fluid enters ports 121 and 122 at opposite ends of the cylinder 120, via respective flexible conduits 123 and 124. The hydraulic conduits 123 and 124 are connected to a reversible pump 125 (indicated only diagrammatically) which pumps the hydraulic fluid from the port 121 to the port 122 and produces a pressure on the piston 117. The pressure force thus applied to the piston 117 moves the push-pull rod 115 outwardly to act on the mechanism for changing the angle of attack of the airfoil section with respect to the rocking shaft 106. The hydraulic pump 125, which is reversible, thus can adjust the angle of attack of the wing 100 to any desired angle.

The rear wing 102 may consist of a left section 103' and a right section 104' cantilevered to the opposite ends of a shaft 105'. The shaft 105' extends through and is bearinged in a shaft 106' of the engine 30. Thus the rear wing 102 has parts and accessories similar to those of the front wing 101 and primed numbers indicate parts corresponding to the unprimed numbers on the front wing assembly; so the rear wing 102 and its parts need not be described in detail.

The shafts 106 and 106' are forced to rock 180° out of phase by the engine 30. When the shaft 106 rotates clockwise (looking forward), the wing tip 103 rotates up and the wing tip 104 rotates down; at the same time, also, the shaft 106' is rotated counterclockwise; thus the wing tip 103' rotates down and the wing tip 104' rotates up.

The rocking shafts 106 and 106' are supported by bearings 126 in a beam 127, and the beam 127 may be splined at 128 to a stub shaft 70', as in Fig. 2. The remainder of the structure of the assembly 100 is illustrated by Fig. 4 and is substantially identical with the structure 20, as is indicated by application of the same reference numerals in the drawings, with a prime added.

Figure 3:
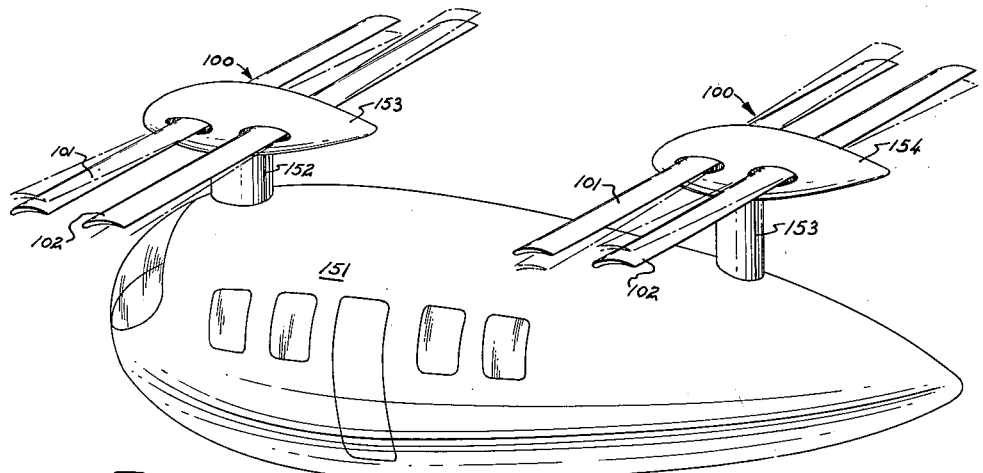
Fig. 3 is a perspective view of a modified form of the flying machine of this invention, which resembles a bi-tandem dragonfly.

*An example of the use of two counter-flapping airfoils with two separate power plants in tandem (Fig. 3)*

Either flapping airfoil assembly 20 or 100 may have its thrust bearing 78, 79 secured to structures 152 and 153, which are secured to each end of a fuselage 151. Nacelles 153 and 154 may be provided around the engine assembly. The fuselage 151 may be provided with a conventional retractable landing gear (not shown). The adjustable means for the flapping airfoils described for Figs. 2 and 4 may be used to maneuver the aircraft in flight in any direction, including vertical take-off and landing.

In the case of a bi-tandem dragonfly (Fig. 3) the mean angle of the rear flapping wings may be tipped down on the right side at the same time that the mean angle of the front flapping wings is tipped down on the left side; this produces a couple on the aircraft which accelerates its front to the left and its rear to the right.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. An ornithopter with flight principles similar to those of a dragonfly, comprising a fuselage, a pair of coaxial shafts, engine means mounted on said fuselage and connected to said shafts for rocking said pair of coaxial shafts 180° out of phase, and a pair of wings, one supported by each said shaft for movement therewith, closely adjacent each other, whereby the flapping of one wing sends a forced draft across the other, oppositely flapping, wing.

2. The ornithopter of claim 1 wherein said engine means comprises four cylinders arranged as the sides of a parallelogram, piston means in said cylinders, and synchronizing means for driving the piston means in parallel cylinders 180° out of phase and the piston means in each adjacent converging pair of cylinders toward and away from each other.

3. The ornithopter of claim 2 wherein said engine pistons are mechanically free from any fixed stroke limits, said free-pistons having means for stopping them pneumatically by recoil by the gas pressure loads on the pistons, thereby exerting only small dynamic stopping loads on said flapping wings, whereby the amplitude and frequency of said flapping wings may be varied by adjusting the explosion pressure on said free-pistons.

4. The ornithopter of claim 1 wherein each said wing extends transverse to its said shaft and is symmetric with respect thereto, so that there is an airfoil portion on each side of each shaft acting as a countermass to the airfoil portion on the opposite side.

5. The ornithopter of claim 1 having means for adjusting the angle of attack of said wings during flight.

6. The ornithopter of claim 5 wherein said last-named means comprises supporting structure for said shafts, said wings being secured rigidly to said shaft, and means for moving said supporting structure relative to said fuselage.

7. The ornithopter of claim 1 wherein each said wing is secured to a transverse shaft that is bearinged in its respective rocking shaft, and means for turning each said transverse shaft relative to its said rocking shaft.

8. The ornithopter of claim 1 having means for turning said wings to lie axially of said fuselage, wheels on said fuselage, and means to drive said wheels, to use said ornithopter as a narrow road vehicle.

9. The ornithopter of claim 1 whereon said wings are arranged in tandem.

10. The ornithopter of claim 1 having means for tilting said wings with respect to the fuselage, for banking and turning the ornithopter.

11. The ornithopter of claim 1 having means for varying the frequency and amplitude of the flapping of the wings.

12. A power device for an ornithopter or the like, comprising a pair of coaxial shafts, a wing mounted transversely to and on both sides of each shaft for movement therewith, and means for rocking said shafts in opposite directions so as to flap said wings 180° out of phase, said wings being parallel to and adjacent each other so that one wing sends a forced draft of air around the other wing.

13. An ornithopter with flight principles similar to those of a bi-tandem dragonfly, comprising two power devices of the type described in claim 12, one said power device at or near each end of the ornithopter fuselage, each said power device being operated independently from the other power device.

14. An ornithopter with several wings arranged in tandem, comprising a fuselage, a pair of coaxial shafts, engine means mounted on said fuselage and connected to said shafts for rocking said pair of coaxial shafts 180° out of phase, and one or more wings supported by and forced to rock with each said shaft by said power means; adjacent wings being mounted on alternate shafts so they will flap counter with respect to each other.

15. The ornithopter of claim 14 wherein one said rocking shaft is hollow and the other said rocking shaft fits inside it.

References Cited in the file of this patent
UNITED STATES PATENTS

| 1,911,695 | Klatt | May 30, 1933 |
| 2,418,569 | Baumann | Apr. 8, 1947 |

FOREIGN PATENTS

| 439,365 | Great Britain | Dec. 5, 1935 |